United States Patent [19]

Iggulden et al.

[11] Patent Number: 5,003,583
[45] Date of Patent: Mar. 26, 1991

[54] FACSIMILE PRINTER BROADCAST EXCHANGE (PBX)

[76] Inventors: Jerry R. Iggulden, 21600 Cleardale St., Santa Clarita, Calif. 91321; Donald A. Streck, 832 Country Dr., Ojai, Calif. 93023

[21] Appl. No.: 352,182

[22] Filed: May 15, 1989

[51] Int. Cl.$^5$ ............................................. H04N 1/00
[52] U.S. Cl. ..................................... 379/100; 379/93; 379/94
[58] Field of Search ............................ 379/100, 94, 93

[56] References Cited

U.S. PATENT DOCUMENTS 4,491,873 1/1985 Takayama ........................... 379/100
4,782,512 11/1988 Hutton ................................. 379/93

Primary Examiner—Jin F. Ng
Assistant Examiner—Stella L. Woo
Attorney, Agent, or Firm—Donald A. Streck

[57] ABSTRACT

This is a facsimile printer broadcast exchange (PBX) system for receiving a facsimile transmission over a telephone line from a facsimile device at a remote loction directed to a telephone number with an extension number and for transmitting the facsimile transmission over a network to one of a plurality of printer units associated with the extension number for printing thereby. There is a data buffer for receiving and holding digital data. An interface is connected to the telephone line for removing and saving the extension number, for establishing and maintaining a bi-directional facsimile communications link with the facsimile device over the telephone line, for using the link to receive the transmission from the facsimile device, and for storing data of the transmission in the data buffer. Data transmission logic removes data from the data buffer means and transmits it to a network in packets addressed to the extension number. The remote printer units each contain a dot-oriented printer, a printer identification code for associating an extension number identifier with the printer, an interface, and printing logic for receiving packets containing data from the interface and for printing pixel data contained therein with the printer. The network interconnects the interface of respective ones of the printer units and the data transmission logic.

9 Claims, 4 Drawing Sheets

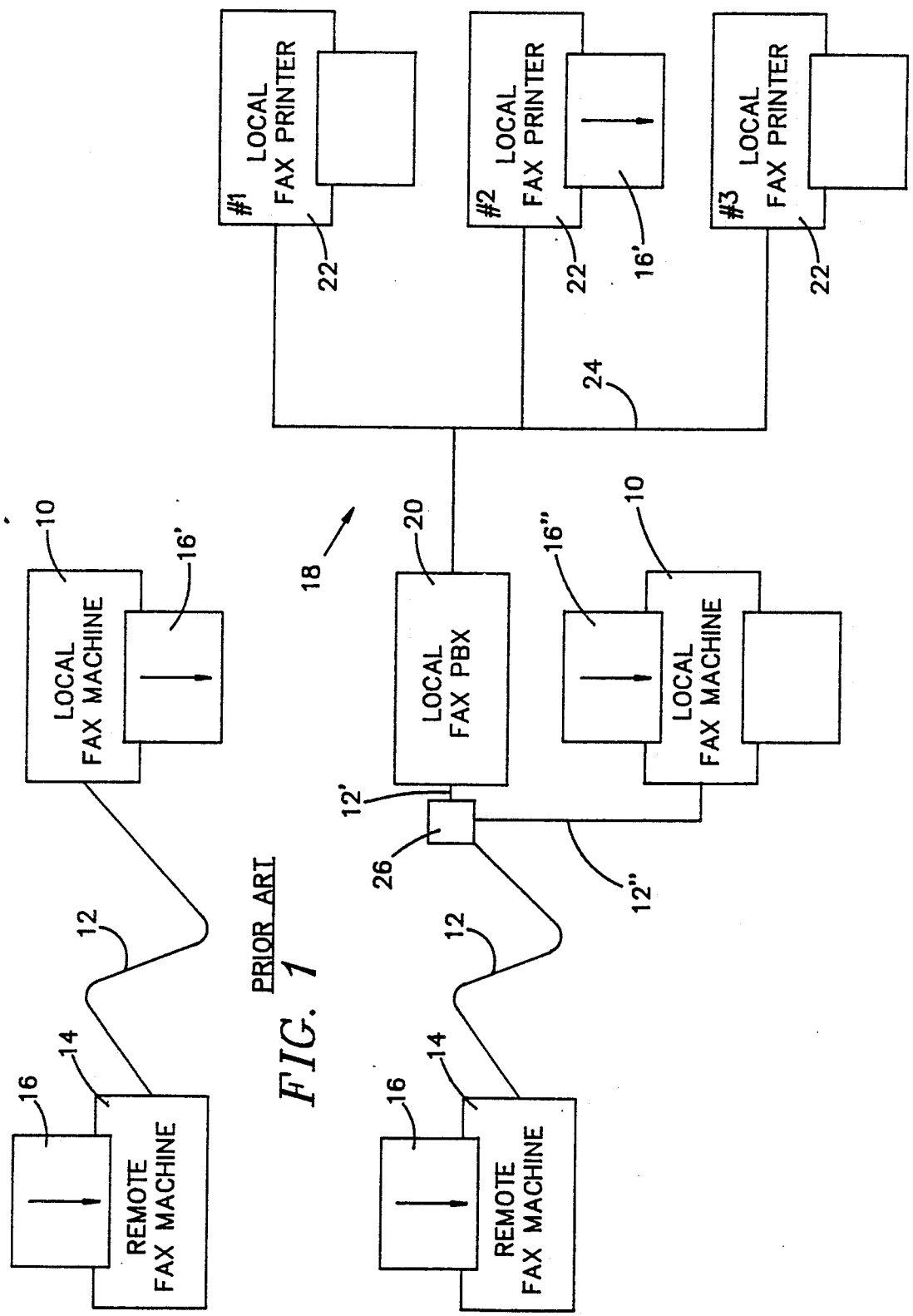

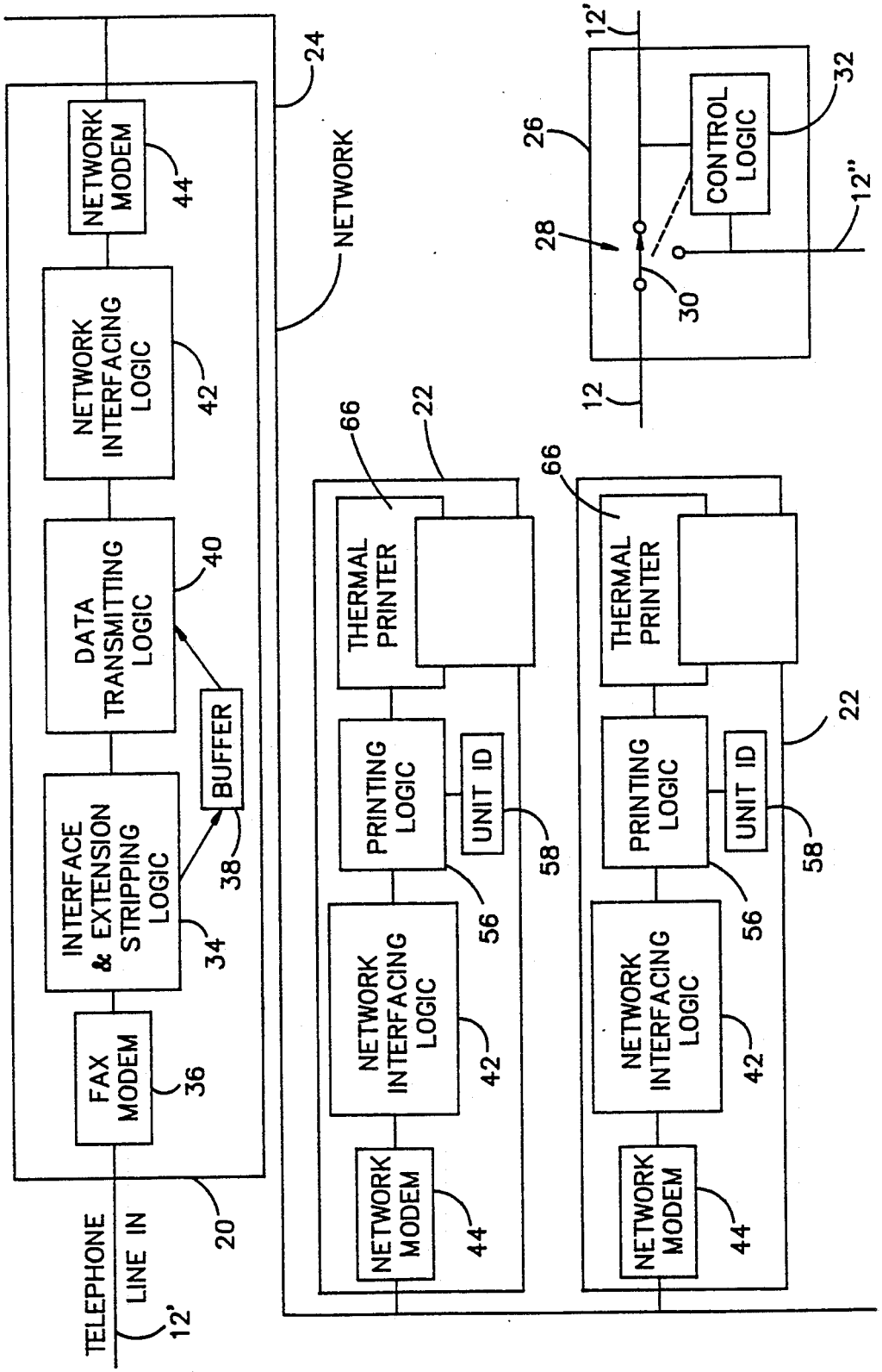

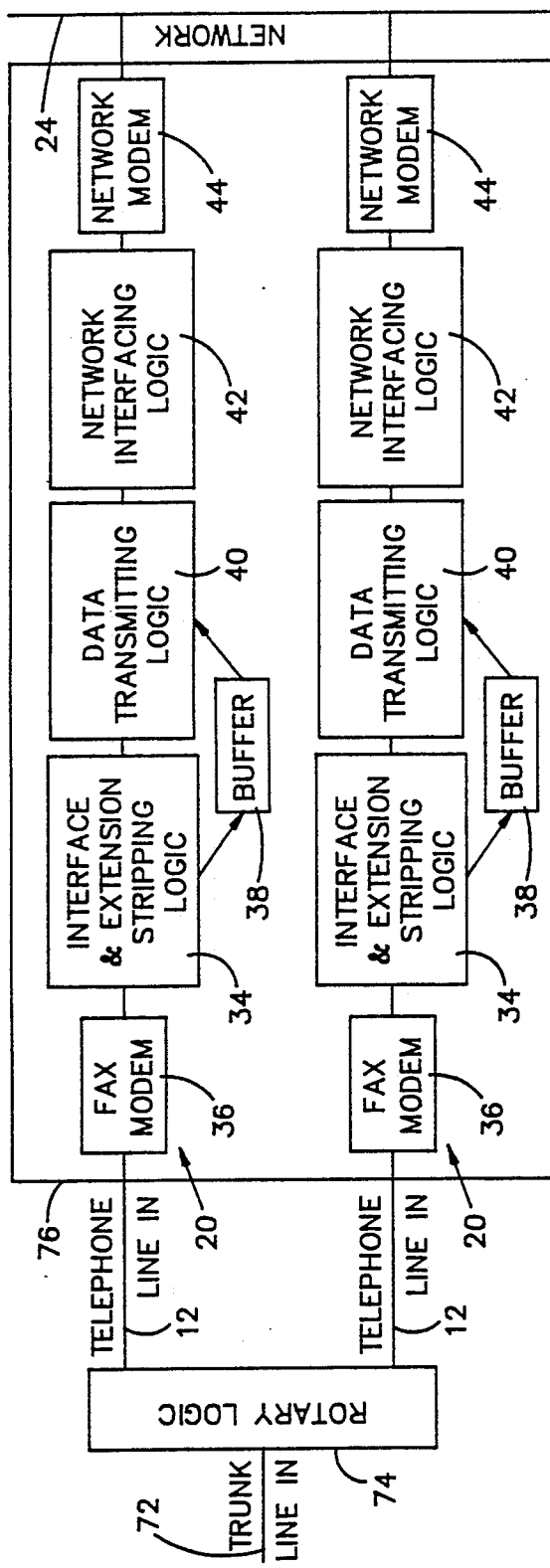
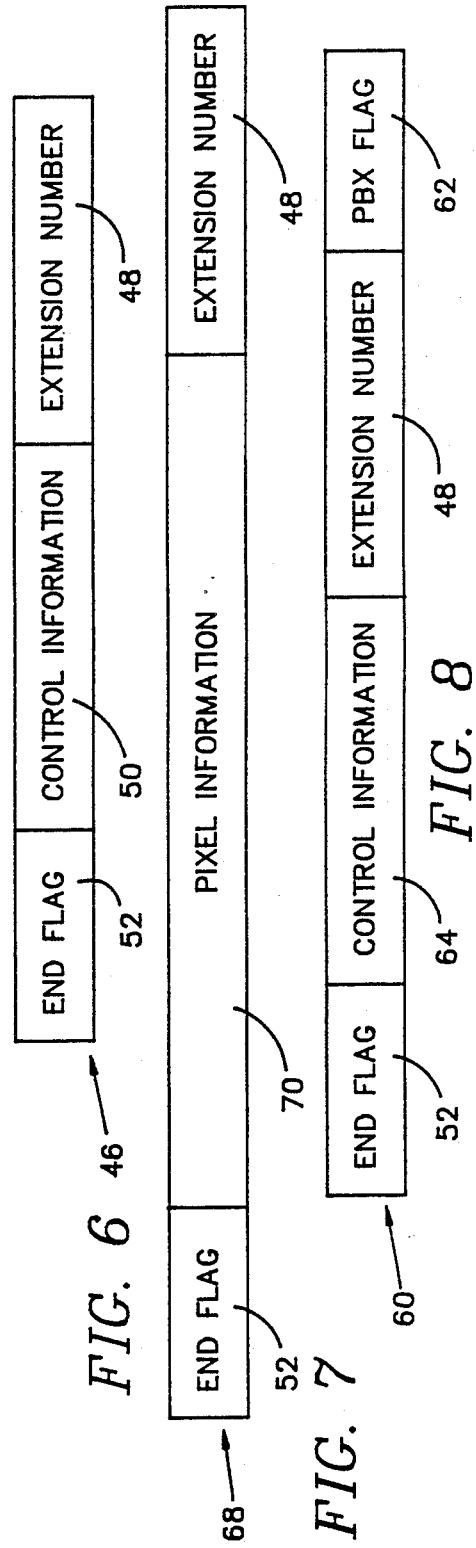
FIG. 5
FIG. 6
FIG. 7
FIG. 8

FACSIMILE PRINTER BROADCAST EXCHANGE (PBX)

BACKGROUND OF THE INVENTION

This invention relates to facsimile machines and, more particularly, to a facsimile printer broadcast exchange system for receiving a facsimile transmission over a telephone line from a facsimile device at a remote location directed to a telephone number with an extension number and for transmitting the facsimile transmission over a network to one of a plurality of printers associated with the extension number for printing thereby, comprising, data buffer means for receiving and holding digital data; interface means connected to the telephone line for removing and saving the extension number, for establishing and maintaining a bi-directional facsimile communications link with the facsimile device over the telephone line, for using the link to receive the transmission from the facsimile device, and for storing data of the transmission in the data buffer means; data transmission logic means for removing data from the data buffer means and for transmitting it to a network in packets addressed to the extension number; a plurality of remote printer units each containing, printer means for printing dot-oriented data on a printing medium, printer identification code means for associating an extension number identifier with the printer unit, interface means for interfacing with a network and the printer identification code means for receiving data from the network in packets having a receiver identifier which is the same as the extension number identifier of the printer unit, and printing logic means for receiving packets containing data from the interface means and for printing pixel data contained therein with the printer means; and, a network interconnecting the interface means of respective ones of the printer units and the data transmission logic means.

Except in the smallest organizations, the receipt of incoming facsimile transmissions is generally a problem. While the number of documents sent by facsimile grows by leaps and bounds every day, system approaches to handling the data flow have not kept up with the demand. The equipment is expensive to the point that it is not practical to have a facsimile machine at every secretarial desk, or even in every general locality where facsimile transmitted documents are received. Most larger organizations have one facsimile machine which is placed in a central location to serve a large user base. Unlike the copier machine and filing which can justify a full-time person to do the work in most cases, the facsimile machine tends to be an orphan as far as responsibility goes. No one wants to watch it for incoming documents and deliver the documents to their intended recipient. The attitude is usually one of "That's not my job." As a consequence, it is not at all uncommon for an important facsimile document (they generally would not have been "fax'd" if not important) to sit in the incoming document bin of the facsimile machine for hours, or even days, before someone blunders across it and has enough interest to see that it is delivered.

While these same companies usually have an elaborate switching telephone system allowing incoming calls to be switched to the desk of the called party, the facsimile hookup is a brute force arrangement as depicted in FIG. 1. The local facsimile machine 10 is connected to a dedicated telephone line 12 having its own telephone number. A remote facsimile machine 14 wishing to send a document 16 to the local machine 10 must dial the number associated with the telephone line 12 and then transmit the document 16 over the dedicated line 12 to the facsimile machine 14 where it is printed by a printer located therein to emerge as the facsimile document 16'.

A similar situation exists with respect to small users who do not wish to (or cannot afford to) invest in a facsimile machine for home use. This, of course, includes the ever-increasing number of employees working at home and self-employed persons working out of a home office. In addition to the cost of the equipment itself, there is also the problem of a second telephone line for the facsimile machine versus the purchase and use of single line switching apparatus which allows a single telephone line to receive both facsimile and voice transmissions. The installation of a second telephone line is costly. The single line switching apparatus, on the other hand, is obnoxious to persons making calls to the apparatus. Moreover, in virtually all cases, because of its method of operation the switching apparatus cannot have a facsimile machine and a telephone answering machine connected thereto at the same time. For the home business that relies on an answering machine instead of a secretary to answer the machine when the owner is out, such an arrangement is totally unacceptable.

Most, if not all, of the foregoing entities are connected to a network of some sort other than the telephone system. Many companies have a local area network (LAN) installed for use with their computer system. If nothing else, there is an AC power system that provides power throughout the building. Most homes that have a home business probably also have cable television with a cable that extends back to a central cable distribution office.

Wherefore, it is an object of this invention to provide a system for the receipt of facsimile transmissions which generally provides the same benefits as a switching telephone system by placing the receipt of incoming facsimile transmissions at, or at least near, the intended recipient at a cost which is not prohibitive to the installation of such a system.

It is another object of this invention to provide a system for receiving incoming facsimile transmissions at a central telephone number with a designated "extension" appended to the beginning of the transmission and for retransmitting the facsimile over a network to the designated recipient for local printing at the recipient's location.

Other objects and benefits of the invention will become apparent from the description which follows hereinafter when taken in conjunction with the drawing figures which accompany it.

SUMMARY

The foregoing objects have been achieved by the facsimile printer broadcast exchange (PBX) system of the present invention for receiving a facsimile transmission over a telephone line from a facsimile device at a remote location directed to a telephone number with an extension number and for transmitting the facsimile transmission over a network to one of a plurality of printers associated with the extension number for printing thereby, comprising, data buffer means for receiving and holding digital data; interface means connected to the telephone line for removing and saving the extension number, for establishing and maintaining a bi-directional facsimile communications link with the facsimile device over the telephone line, for using the link to receive the transmission from the facsimile device, and for storing data of the transmission in the data buffer means; data transmission logic means for removing data from the data buffer means and for transmitting it to a network in packets addressed to the extension number; a plurality of remote printer units each containing, printer means for printing dot-oriented data on a printing medium, printer identification code means for associating an extension number identifier with the printer unit, interface means for interfacing with a network and the printer identification code means for receiving data from the network in packets having a receiver identifier which is the same as the extension number identifier of the printer unit, and printing logic means for receiving packets containing data from the interface means and for printing pixel data contained therein with the printer means; and, a network interconnecting the interface means of respective ones of the printer units and the data transmission logic means.

The preferred embodiment also includes a standard bi-directional facsimile machine and switching means having an input connected to the telephone line, a first output connected to an input of the interface means, and a second output connected to an input of the facsimile machine for normally connecting the telephone line to the first output and for selectively connecting the telephone line to the second output when no extension number is specified as part of an incoming call. The preferred switching means includes logic for connecting the telephone line to the second output when the facsimile machine is taken off hook and the interface means has no established facsimile communications link with a facsimile device over the telephone line whereby the telephone line can be used by the facsimile machine to send facsimile transmissions.

Also in the preferred embodiment, the data transmission logic means includes first logic means for generating a control packet containing control information to a selected one of the remote printer units and for transmitting it to the network addressed to the extension number; and, the interface means each includes second logic means for receiving a control packet having a receiver identifier which is the same as the extension number identifier of the printer unit and for acting on information contained therein. Additionally, it is preferred that the interface means each include third logic means for generating a response packet containing response information to the data transmission logic means and for transmitting it to the network addressed to the data transmission logic means; and, the data transmission logic means include fourth logic means for receiving a response packet having a receiver identifier which is unique to the data transmission logic means and for acting on information contained therein.

DESCRIPTION OF THE DRAWINGS

FIG. 1 is a simplified drawing of a typical prior art facsimile system wherein one facsimile machine at a remote location calls another facsimile machine at a local site over a dedicated telephone line/number.

FIG. 2 is a simplified drawing of a facsimile system according to this invention wherein one facsimile machine at a remote location calls a facsimile printer broadcast exchange (PBX) at a local site over a dedicated telephone line/number with an extension number designating which of several printing stations is to print out the data.

FIG. 3 is a functional block diagram of the facsimile printer broadcast exchange (PBX) and two representative printing stations.

FIG. 4 is a functional block diagram of the switching module of the preferred embodiment of this invention which switches the telephone line between the printer broadcast exchange (PBX) when an extension is provided and a standard facsimile machine when no extension is provided or when an outgoing facsimile is to be transmitted.

FIG. 5 is a functional block diagram of a facsimile printer broadcast exchange (PBX) hooked up to multiple telephone lines through a telephone line "rotary" switching system.

FIG. 6 is a simplified drawing of a representative data packet that would be sent from the printer broadcast exchange (PBX) to the printing stations over the interconnecting network to provide control information thereto.

FIG. 7 is a simplified drawing of a representative data packet that would be sent from the printer broadcast exchange (PBX) to the printing stations over the interconnecting network to provide pixel information for printing thereto.

FIG. 8 is a simplified drawing of a representative data packet that would be sent from a selected printing station to the printer broadcast exchange (PBX) over the interconnecting network to provide required status feedback information.

DESCRIPTION OF THE PREFERRED EMBODIMENT

Figure 9:
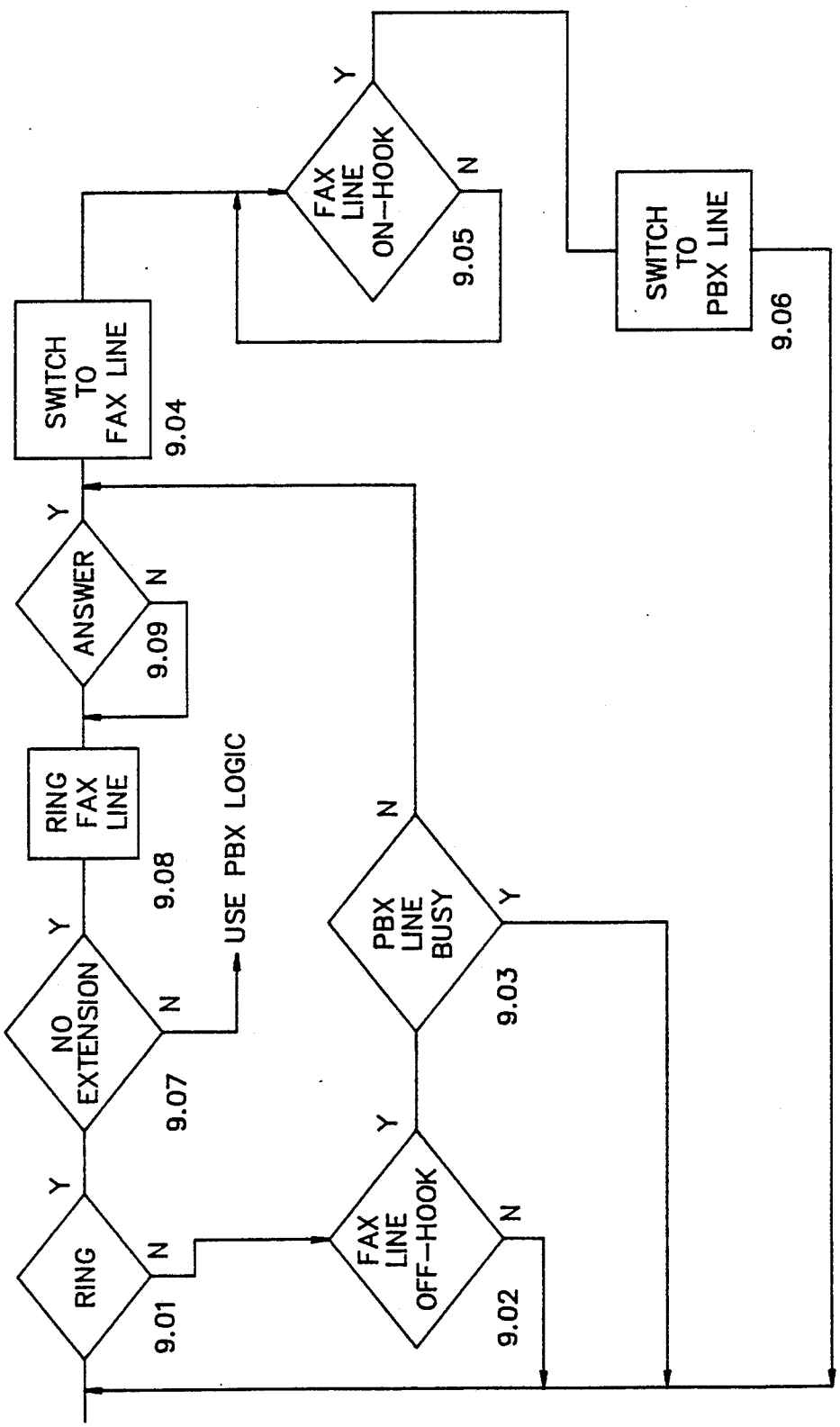
FIG. 9 is a flowchart of the switching logic employed in the preferred embodiment of the present invention.

Like the telephone system which has a local base exchange which receives the incoming calls and switches them to a telephone instrument at the extension location, the system of this invention, generally indicated as 18 in FIG. 2 comprises a facsimile printer broadcast exchange (PBX) unit 20 connected to a plurality of low-cost local fax printer units 22 over a network 24. In the preferred embodiment, an incoming switching unit 26 is provided to switch incoming calls without an extension designation to a default local facsimile machine 10, which is also provided access to the incoming telephone line 12 by the switching unit 26 for the sending of outgoing facsimile transmissions. Thus, as depicted in FIG. 2, the remote facsimile machine 14 is connected to the telephone line 12 as usual. The telephone line 12 is connected to the incoming switching unit 26 which, in turn, is connected to the PBX unit 20 by line 12' and to the local facsimile machine 10 by line 12". If the sender does not know the receiver's extension, the general telephone number associated with the telephone line 12 entering the incoming switching unit 26 is dialed. This results in the document 16 being directed to the local facsimile machine 10 for printing. To send a document 16" to the remote facsimile machine 14, the local facsimile machine 10 is used and the call is directed through the incoming switching unit 26 to the telephone line 12 in the usual manner. If the sender does know the receiver's extension (say #2, for example), the general telephone number associated with the telephone line 12 entering the incoming switching unit 26 is dialed along with the extension number (i.e. 2). In this case, the incoming switching unit 26 accepts the call and transmits the data down the network to the #2 fax printer unit 22 for printing thereby.

The operation of the system 18 of this invention can best be understood with reference to FIGS. 3, 4, and 6–9. The incoming switching unit 26 contains a two-position switch 28. In the default mode, the switch 28 connects its selector 30 (which is connected to the incoming telephone line 12) to one of its outputs which is connected to the line 12' connected to the PBX unit 20. When switched by the control logic 32, the switch 28 connects its selector 30 to the other of its outputs which is connected to the line 12" connected to the local facsimile machine 10. The control logic 32 is connected to sense both line 12' and line 12". A flowchart depicting representative logic for the control logic 32 is shown in FIG. 9. As those skilled in the art will readily recognize and appreciate, the various logic and interconnections of functional components as disclosed herein are only representative of one way in which the present invention could be implemented. It is the inventors' desire and intention that the specification and appended claims be accorded a breadth in keeping with the scope and spirit of the invention generally disclosed herein.

As can be seen in FIG. 9, it is preferred that the control logic 32 be a continual loop constantly checking on the status of the lines 12 and 12' and periodically checking on the status of line 12", as appropriate. At decision block 9.01, the logic 32 checks for a ring condition on the telephone line 12 to see if anyone one is calling in. If not, the logic 32 proceeds to decision block 9.02 where it checks to see if line 12" is "off hook"; that is, if the local facsimile machine 10 is trying to make an outgoing call. If not, the logic 32 returns to the beginning of its loop at decision block 9.01. Since the printer units 22 cannot make an outgoing call, these are the only two things to be checked for in the static state.

When the line 12" goes off hook, the logic 32 proceeds to decision block 9.03 where it checks to see if line 12' is busy (i.e. a facsimile is being received). If it is, the local facsimile machine 10 cannot have access to telephone line 12 and the logic 32 again returns to the beginning of its loop at decision block 9.01. If desired, a local "busy signal" could be generated to the local facsimile machine 10 over line 12". If line 12' is not busy, the logic 32 proceeds to action block 9.04 where the switch 28 is switched to connect the telephone line 12 to line 12". The facsimile machine 10 can then be used to send an outgoing facsimile in its usual manner. The logic 32 then proceeds to decision block 9.05 where it stays in a loop watching for the facsimile machine 10 to go back on hook (which occurs when the transmission is completed). When the facsimile machine 10 goes back on hook, the logic 32 proceeds to action block 9.06 to switch the switch 28 back to its default position with the telephone line 12 connected to line 12' and then once again returns to the beginning of its loop at decision block 9.01.

Returning to decision block 9.01, when a ring is detected the logic 32 moves to decision block 9.07. It should be noted at this point that the PBX unit 20 as depicted in FIG. 3 has interface and extension stripping logic 34 at the beginning thereof. The logic of decision block 9.01 may be included, at least in part, within logic 34. In any event, when the telephone line 12 rings and is answered, the logic 32, 34 determines whether or not an extension number is being dialed in. The calling facsimile machine will wait a substantial period of time (relatively speaking) after the called line has been answered sending a series of query tones and waiting for a responding carrier from the called machine before determining that it has been unsuccessful in contacting another facsimile machine and establishing a transmitting link therewith. Thus, the logic 32, 34 can make its determination in much the same way that single line switching systems as are known in the art make the decision. For example, if the query tones are being received, there will not be an extension following. On the other hand, if a pulsed or tone number is received within a pre-established period of time after the call is answered, it can be assumed that such number is an extension designation. It should be noted in passing that most, if not all, facsimile machines have a provision for MANUAL mode operation in which the number is dialed and a receiving carrier identified before the sending facsimile machine is activated to begin its transmission sequence. Thus, the MANUAL mode can be used to first dial the main telephone number and then input an extension number following an answer before the START button is depressed to begin transmission.

When the logic 32, 34 finds that there is no extension provided, it goes to action block 9.08 where a ring signal is applied to line 12". The logic 32 then goes to decision block 9.09 where it waits for the local facsimile machine 10 to answer. When an answer is received, the logic proceeds to action block 9.04 as described above which causes the switch 28 to connect the telephone line 12 to line 12". Thus, the local facsimile machine 10 answers the incoming call in the usual manner and is the default printer when no designated extension is provided. While the foregoing approach is preferred because it is expected that every installation will have at least one standard facsimile machine for transmitting outgoing facsimiles, one of the printer units 22 could, of course, be designated as the default printer, if desired.

When an extension is provided as part of an incoming call sequence, the call is handled by the PBX unit 20. As depicted in FIG. 3, the unit 20 first has a fax modem 36 connected to line 12' for receiving data from line 12' and for sending data on line 12' in the usual manner. The fax modem 36 interfaces with interface and extension stripping logic 34 which was mentioned briefly above. The interface and extension stripping logic 34 performs the usual handshaking functions necessary to interface with a transmitting facsimile machine. Additionally, it strips off the extension number from the incoming transmission and saves it for later use. It also strips off control information from pixel data information as contained in the incoming stream from the transmitting facsimile machine and stores line segments of pixel data as received into a buffer 38.

In a normal facsimile machine, once the transmission connection has been affected with a transmitting machine, the logic driving the printing portion simply receives the data and outputs it to the printhead on a line by line basis. The printing process is contained within the same case and is connected directly to the printing logic. If the facsimile machine is on and ready, so is the printer by definition. Thus, the printing logic knows immediately when a line of pixel data has been output and can acknowledge and accept the next line of data. In the PBX unit 20 of this invention, the problem is not so simple and straightforward. The printer is located at some distance and is connected by a network of some sort. The logic cannot assume anything. Thus, the object of the PBX unit 20 is to fool the transmitting facsimile machine into thinking that it is transmitting to a normal facsimile machine on the one hand while receiving the data from the transmitting facsimile machine and causing it to be printed at the remote site on the other hand. Thus, the buffer 38 must be of a size that can accept the maximum stream of data that will be sent by a transmitting facsimile machine before requiring an acknowledgement from the receiving facsimile machine before continuing with further transmission.

Interfacing with the interface and extension stripping logic 34 on the one side is data transmitting logic 40. On its other side, the data transmitting logic 40 interfaces with network interfacing logic 42. The network interfacing logic 42, in turn, interfaces to the network 24 through a network modem 44 as appropriate to the network being employed. At this point, it is probably worth while to address the network considerations briefly. As mentioned above, various entities can be employed as the network 24. In each case, methods of interfacing with such a medium and using it for the transmission of data are well known to those skilled in the art. Since the particular type of medium used for the network 24 and the methods of attachment thereto are not points of novelty of this invention per se, those aspects will not be addressed in any detail herein in the interest of simplicity and the avoidance of redundancy. Within a company environment, if a LAN is available, its use is preferred as it is intended for digital data transmission and its use is straightforward. Where a LAN is not available, a co-axial cable or a twisted pair of wires can be run, if desired. Sometimes spare wires may be available in, for example, the telephone wiring. In such case, those can be used. The use of the AC power lines is a preferred choice where an existing spare wiring system is not available. The power lines are already in place and generally available in every office. The printer units 22 will need to be plugged into an AC power outlet in any event to provide the power thereto and, therefore, it is a simple matter to include the interface apparatus within the same case. Technology for interfacing and conducting facsimile transmissions through the AC power lines is available commercially as, for example, in units sold under the trademark Phonex.

As mentioned earlier herein, it is also contemplated by the inventors herein that the network 24 could comprise a cable television company's co-axial cable network. This could afford an auxiliary business to the local cable television company within a geographical area. Just as numerous private companies offer "postoffice" boxes separate and apart from the official boxes offered by the U.S. Postal Service, each local cable television company could offer a main facsimile telephone number with "extensions", where the extensions were, in fact, remotely located printer units 22 according to this invention provided on a lease basis, connected to the PBX unit 20 at the central office by the company's in-place cable network, and addressed by the user's customer identification number, i.e. their "extension".

Thus, the network interfacing logic 42 and the network modem 44 work in combination to place messages onto and remove them from the network 24 according to the type of network 24 employed. Such techniques as "contention resolution" which are well known to those skilled in the network art are also accomplished therein and will not be addressed further. Their implementation, in each case, can be according to techniques well known to those skilled in the art without undue experimentation. Other than the decision that an extension has been provided as described earlier herein, the major deviation from the prior art of facsimile receipt and printing resides in the data transmitting logic 40 and the logic at the printer units 22 now to be discussed. Again, while those skilled in the art will undoubtedly find other ways of implementing this invention, for purposes of a complete disclosure it is presently preferred that the data transmitting logic 40 communicate to and from the printer units 22 using a packetized data approach as depicted in FIGS. 6-8. While it is possible that an extended data passing link could be affected over the network 24, the following approach is preferred as it has proved to be reliable in inter-computer message passing environments presently in common usage. Also, by employing message packets, more than one user can be communicated with at the same time. Thus, as will be addressed in greater detail at a later time herein, messages from different input sources can be transmitted and printed at their associated "extensions" simultaneously.

To initiate a transmission from the PBX unit 20 to one of the printer units 22, the data transmitting logic 40 transmits a control packet 46 as depicted in FIG. 6. The control packet 46 begins with an extension field 48 containing the extension number of the intended recipient. This is followed by a control field 50 containing control information the PBX unit 20 is sending to the indicated printer unit 22. An end flag 52 designates the end of the packet 46. If fixed length packets are used for all purposes, the end flag 52 can be eliminated in most cases. Thus, for example, the PBX unit 20 through the data transmitting logic 40 may first ask, "Are you there and ready?" At each printer unit 22 there is a network modem 44 interfacing with the network 24 on one side and with network interfacing logic 42 on the other side. For purposes of this discussion and disclosure, we will assume that the network modems 44 and network interfacing logics 42 are substantially identical in each case and that any additional logic is contained in the printing logic 56 connected to the network interfacing logic 42. In any event, the control packet 46 is "broadcast" over the network 24 and is seen by all the printer units 22. Only the unit 22 in which the printing logic 56 recognizes the extension number contained in field 48 as being identical to the printer unit's identification code responds to the packet 46 (or any others containing its extension number in field 48). It is preferred that the identification code for each printer unit 22 be easily settable as by the use of a set of thumbwheels 58 connected to the printing logic 56 to be read thereby.

In response to the "Are you there and ready?" query, the printing logic 56 of the answering unit sends a response packet 60 as depicted in FIG. 8 if it is, in fact, on and ready. If no response is received by the data transmitting logic 40, a "line error" could be generated at the transmitting facsimile machine just as if there were an error at a single receiving facsimile machine (e.g. facsimile machine 10). Unless the conditions are not conductive to such an implementation (as in the case of the television cable company having the PBX unit 20), it is preferred that if an addressed printer unit 22 is not available to accept a transmission, the transmission be rerouted to the local default facsimile machine in the manner described above when no extension was provided. When sent, a response packet 60 begins with a PBX flag 62 which identifies the broadcast message as being intended for the PBX unit 20 and not for any other printer unit 22. The PBX flag 62 is followed by an extension field 48 containing the identification code of the responding printer unit 22, a response field 64 containing the information being transmitted from the printer unit 22 to the PBX unit 20, and then an end flag 52. In the first instance, the response might be, "Yes I am here, received your message, and am ready to print." Later, the message might be simply an acknowledgement effectively passing the information to the PBX unit 20 that, "I successfully received your last message, have finished acting on it, and am ready for the next step."

When a successful link has been established between the PBX unit 20 and the addressed printer unit 22, the data transmitting logic 40 transmits the pixel data from the buffer 38 to the printer unit 22 printing by the thermal printer 66 at the printer unit 22. The transmission of the pixel data is via pixel packets 68 as depicted in FIG. 7. Each pixel packet 68 begins with an extension field 48 with which to address the intended recipient and ends with an end flag 52 designating the end of the transmission. In between is a data field 70 containing the pixel information to be printed by the thermal printer 66. The data as originally transmitted by the sending facsimile machine may be transmitted to the printer unit 22 to be interpreted by the printing logic 56 or may be re-formatted by the data transmitting logic 40 for direct printing by the printing logic 56 on the associated printer 66. As a matter of preference, the inventors herein prefer the latter approach as the printer units 22 can be assembled almost entirely of substantially off-the-shelf components with the custom logic being located primarily at the PBX unit 20.

As mentioned earlier, larger installations might want to be able to receive and print multiple messages from multiple sources simultaneously. As will have been realized from the description hereinbefore, the equipment as described will only communicate with one remotely-transmitting facsimile machine at a time. To receive multiple inputs, the components of the PBX unit 20 shown in FIG. 3 must be duplicated for each incoming telephone line in the manner shown in FIG. 5. The telephone trunk line 72 from the telephone company is input to rotary logic 74 which is typically supplied by the telephone company as well. With such well known telephone equipment, the user publishes a first telephone number in the rotary sequence of numbers being paid for. A caller calls the first number of the sequence; but, if the first number is busy, the rotary logic 74 automatically goes through the list of available telephone numbers at the site and picks a next available one, if available, before indicating a busy condition (which only exists if all the numbers are busy). With such a multi-line PBX unit, each of the individual PBX units 20 could, of course, be housed in a common case 76, if desired.

Wherefore, having thus described our invention, what is claimed is:

1. A facsimile printer broadcast exchange system for receiving a facsimile transmission over a telephone line from a facsimile device at a remote location directed to a telephone number with an extension number and for simultaneously transmitting the facsimile transmission over a network to one of a plurality of printers associated with the extension number for printing thereby, comprising:

(a) data buffer means for receiving and temporarily holding digital data;
(b) interface means connected to the telephone line for removing and saving the extension number, for establishing and maintaining a bi-directional facsimile communications link with the facsimile device over the telephone line, for using the link to receive the transmission from the facsimile device, and for temporarily storing data of the transmission in said data buffer means;
(c) data transmission logic means for removing data from said data buffer and for transmitting it to a network in packets addressed to the extension number in response to received response packets;
(d) a plurality of remote printer units each containing,
(d1) printer means for printing dot-oriented data on a printing medium,
(d2) printer identification code means for associating an extension number identifier with said printer unit,
(d3) interface means for interfacing with a network and said printer identification code means for receiving data from said network in packets having a receiver identifier which is the same as said extension number identifier of the printer unit and acknowledgement logic means for sending response packets back to said data transmission logic means over said network to indicate the associated said remote printer unit has received a said packet and has finished acting upon it, and
(d4) printing logic means for receiving packets containing data from said interface means for printing pixel data contained therein with said printer means; and
(e) a network interconnecting said interface means of respective ones of said printer units and said data transmission logic means whereby a received incoming facsimile transmission is printed with a selected one of said remote printer units acting as remote printer as it is being received.

2. The facsimile printer broadcast exchange system of claim 1 and additionally comprising:
(a) a standard bi-directional facsimile machine; and
(b) switching means having an input connected to the telephone line, a first output connected to an input of said interface means, and a second output connected to an input of said facsimile machine for normally connecting the telephone line to said first output and for selectively connecting the telephone line to said second output when no extension number is specified as part of an incoming call.

3. The facsimile printer broadcast exchange system of claim 2 and additionally comprising:
said switching means including logic for connecting the telephone line to said second output when said facsimile machine is taken off hook and said interface means has no established facsimile communications link with a facsimile device over the telephone line whereby the telephone line can be used by said facsimile machine to send facsimile transmissions.

4. The facsimile printer broadcast exchange system of claim 1 and additionally comprising:
(a) said data transmission logic means including first logic means for generating a control packet containing control information to a selected one of said remote printer units and for transmitting it to said network addressed to the extension number; and (b) said interface means each including second logic means for receiving a said control packet having a receiver identifier which is the same as said extension number identifier of the printer unit and for acting on information contained therein.

5. The facsimile printer broadcast exchange system of claim 1 and additionally comprising:
(a) said interface means each including third logic means for generating a response packet containing response information to said data transmission logic means and for transmitting it to said network addressed to said data transmission logic means; and
(b) said data transmission logic means including fourth logic means for receiving a said response packet having a receiver identifier which is unique to said data transmission logic means and for acting on information contained therein.

6. A facsimile printer broadcast exchange system for receiving a facsimile transmission over a telephone line from a facsimile device at a remote location directed to a telephone number with an extension number and for simultaneously transmitting the facsimile transmission over a network to one of a plurality of printers associated with the extension number for printing thereby, comprising:
(a) data buffer means for receiving and temporarily holding digital data;
(b) interface means connected to the telephone line for removing and saving the extension number, for establishing and maintaining a bi-directional facsimile communications link with the facsimile device over the telephone line, for using the link to receive the transmissiion from the facsimile device, and for storing data of the transmission in said data buffer means;
(c) data transmission logic means for removing data from said data buffer means and for transmitting it to a network in packets addressed to the extension number;
(d) a plurality of remote printer units each containing,
(d1) printer means for printing dot-oriented data on a printing medium,
(d2) printer identification code means for associating an extension number identifier with said printer unit,
(d3) interface means for interfacing with a network and said printer identification code means for receiving data from said network in packets having a receiver identifier which is the same as said extension number identifier of the printer unit, and
(d4) printing logic means for receiving packets containing data from said interface means and for printing pixel data contained therein with said printer means;
(e) a network interconnecting said interface means of respective ones of said printer units and said data transmission logic means; and additionally,
(f) said data transmission logic means including first logic means for generating a control packet containing control information to a selected one of said remote printer units and for transmitting it to said network addressed to the extension number;
(g) said interface means each including second logic means for receiving a said control packet having a receiver identifier which is the same as said extension number identifier of the printer unit and for acting on information contained therein;
(h) said interface means each including third logic means for generating a response packet containing response information to said data transmission logic means and for transmitting it to said network addressed to said data transmission logic means; and,
(i) said data transmission logic means including fourth logic means for receiving a said response packet having a receiver identifier which is unique to said data transmission logic means and for acting on information contained therein whereby a received incoming facsimile transmission is printed with a selected one of said remote printer units acting as a remote printer as it is being received.

7. The facsimile printer broadcast exchange system of claim 6 and additionally comprising:
(a) a standard bi-directional facsimile machine; and
(b) switching means having an input connected to the telephone line, a first output connected to an input of said interface means, and a second output connected to an input of said facsimile machine for normally connecting the telephone line to said first output and for selectively connecting the telephone line to said second output when no extension number is specified as part of an incoming call.

8. The facsimile printer broadcast exchange system of claim 7 and additionally comprising:
said switching means including logic for connecting the telephone line to said second output when said facsimile machine is taken off hook and said interface means has no established facsimile communications link with a facsimile device over the telephone line whereby the telephone line can be used by said facsimile machine to send facsimile transmissions.

9. A fascimile printer broadcast exchange system for receiving a facsimile transmission over a telephone line from a facsimile device at a remote location directed to a telephone number with an extension number and for transmitting the facsimile transmission over a network to one of a plurality of printers associated with the extension number for printing thereby, comprising:
(a) data buffer means for receiving and holding digital data;
(b) interface means connected to the telephone line for removing and saving the extension number, for establishing and maintaining a bi-directional facsimile communications link with the facsimile device over the telephone line, for using the link to receive the transmission from the facsimile device, and for storing data of the transmission in said data buffer means;
(c) data transmission logic means for removing data from said data buffer means and for transmitting it to a network in packets addressed to the extension number;
(d) a plurality of remote printer units each containing, printer means for printing dot-oriented data on a printing medium, printer identification code means for associating an extension number identifier with said printer identification code means for receiving data from said network in packets having a receiver identifier which is the same as said extension number identifier of the printer unit, and printing logic means for receiving packets containing data from said interface means and for printing pixel data contained therein with said printer means;

(e) a network interconnecting said interface means of respective ones of said printer units and said data transmission logic means;

(f) said data transmission logic means including a first logic means for generating a control packet containing control information to a selected one of said remote printer units and for transmitting it to said network addressed to the extension number as well as fourth logic means for receiving a response packet having a receiver identifier which is unique to said data transmission logic means and for acting on information contained therein;

(g) said interface means each including second logic means for receiving a said control packet having a receiver identifier which is the same as said extension number identifier of the printer unit and for acting on information contained therein as well as third logic means for generating a said response packet containing response information to said data transmission logic means and for transmitting it to said network addressed to said data transmission logic means;

(h) a standard bi-directional facsimile machine; and (i) switching means having an input connected to the telephone line, a first output connected to an input of said interface means, and a second output connected to an input of said facsimile machine for normally connecting the telephone line to said first output and for selectively connecting the telephone line to said second output when no extension number is specified as part of an incoming call, said switching means including logic for connecting the telephone line to said second output when said facsimile machine is taken off hook and said interface means has no established facsimile communications link with a facsimile device over the telephone line whereby the telephone line can be used by said facsimile machine to send facsimile transmissions.

* * * * *